United States Patent [19]

Sheppard et al.

[11] Patent Number: 5,216,948
[45] Date of Patent: Jun. 8, 1993

[54] ENVIRONMENT CONTROL CHAMBER WITH SAFETY SWITCH

[75] Inventors: Michael E. Sheppard, 2156 Clinton Ave., #1, Alameda, Calif. 94501; Thomas M. Sheppard, Santa Ana, Calif.

[73] Assignee: Michael E. Sheppard, Alameda, Calif.

[21] Appl. No.: 440,805

[22] Filed: Nov. 24, 1989

[51] Int. Cl.$^5$ .................... A21C 13/00; A21D 8/02
[52] U.S. Cl. .................................. 99/483; 99/467; 99/341; 99/342; 126/281; 135/92; 135/98; 219/385
[58] Field of Search ............... 99/449, 467, 493, 342, 99/341, 483, 646 R; 126/281; 219/400, 385, 535, 545, 211, 212, 527, 528, 529; 135/91, 98, 115, 116, 92, 93, 94, 95, 96, 97

[56] References Cited

U.S. PATENT DOCUMENTS

| | | | |
|---|---|---|---|
| 2,771,087 | 11/1956 | Simonson | 135/98 |
| 3,361,895 | 1/1968 | Achner | 219/385 |
| 3,418,453 | 12/1968 | Sparks | 126/281 |
| 4,210,073 | 7/1980 | Weiss | 99/483 |
| 4,565,703 | 1/1986 | Garber et al. | 219/385 |

FOREIGN PATENT DOCUMENTS 1155108  4/1958  France .................................. 99/234

Primary Examiner—Harvey C. Hornsby
Assistant Examiner—Gary K. Graham
Attorney, Agent, or Firm—Glen R. Grunewald

[57] ABSTRACT

A collapsible environmental chamber in which bread dough may be placed during rising, the chamber including umbrella-like ribs between which fabric panels are positioned, each fabric panel having a skirt depending beneath the straight line between adjacent leg ends whereby the chamber in its expanded condition will have a skirt portion lying loosely adjacent a supporting surface to prevent drafts from entering the interior of the chamber during the bread rising process.

1 Claim, 4 Drawing Sheets

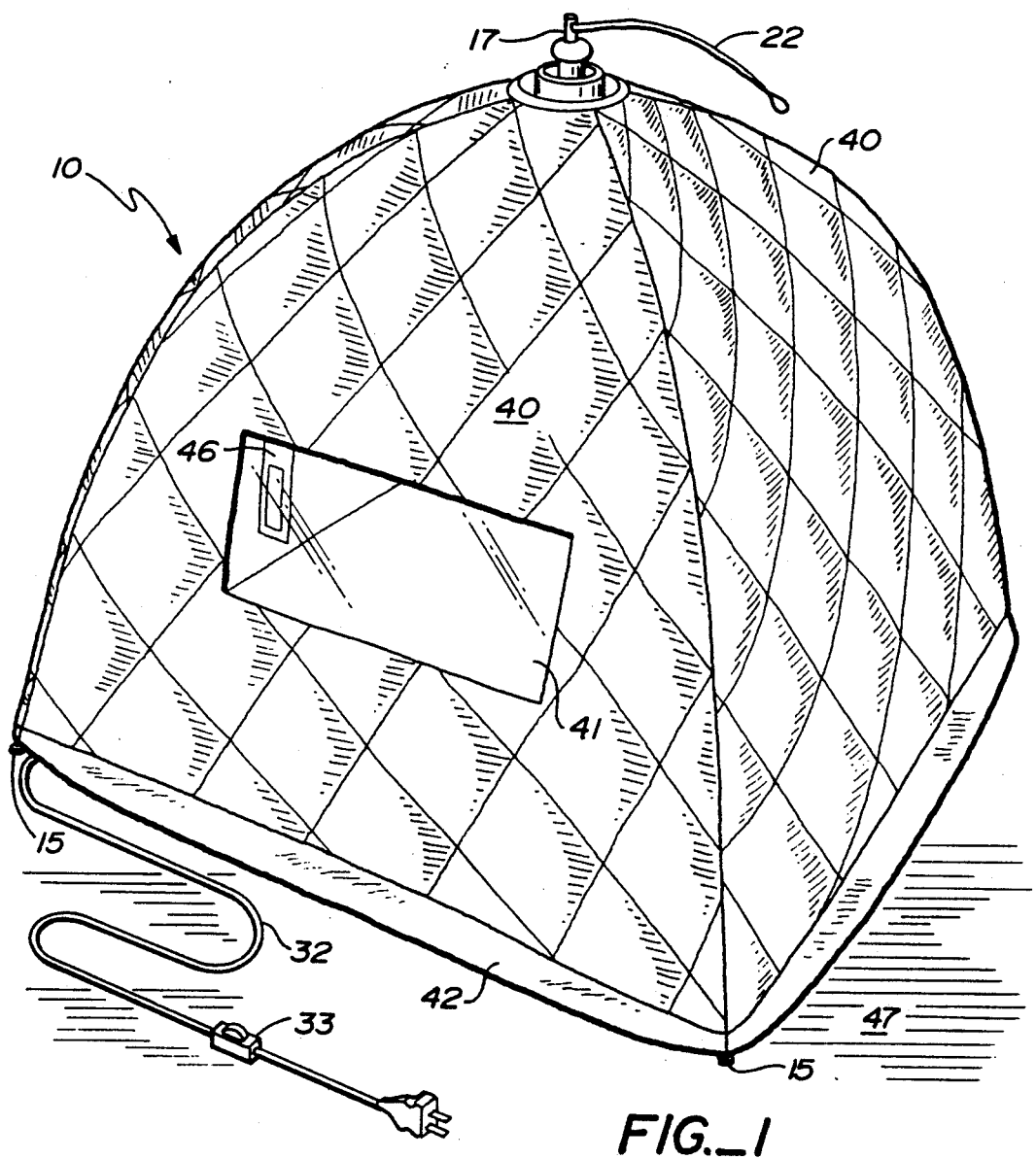
FIG._1

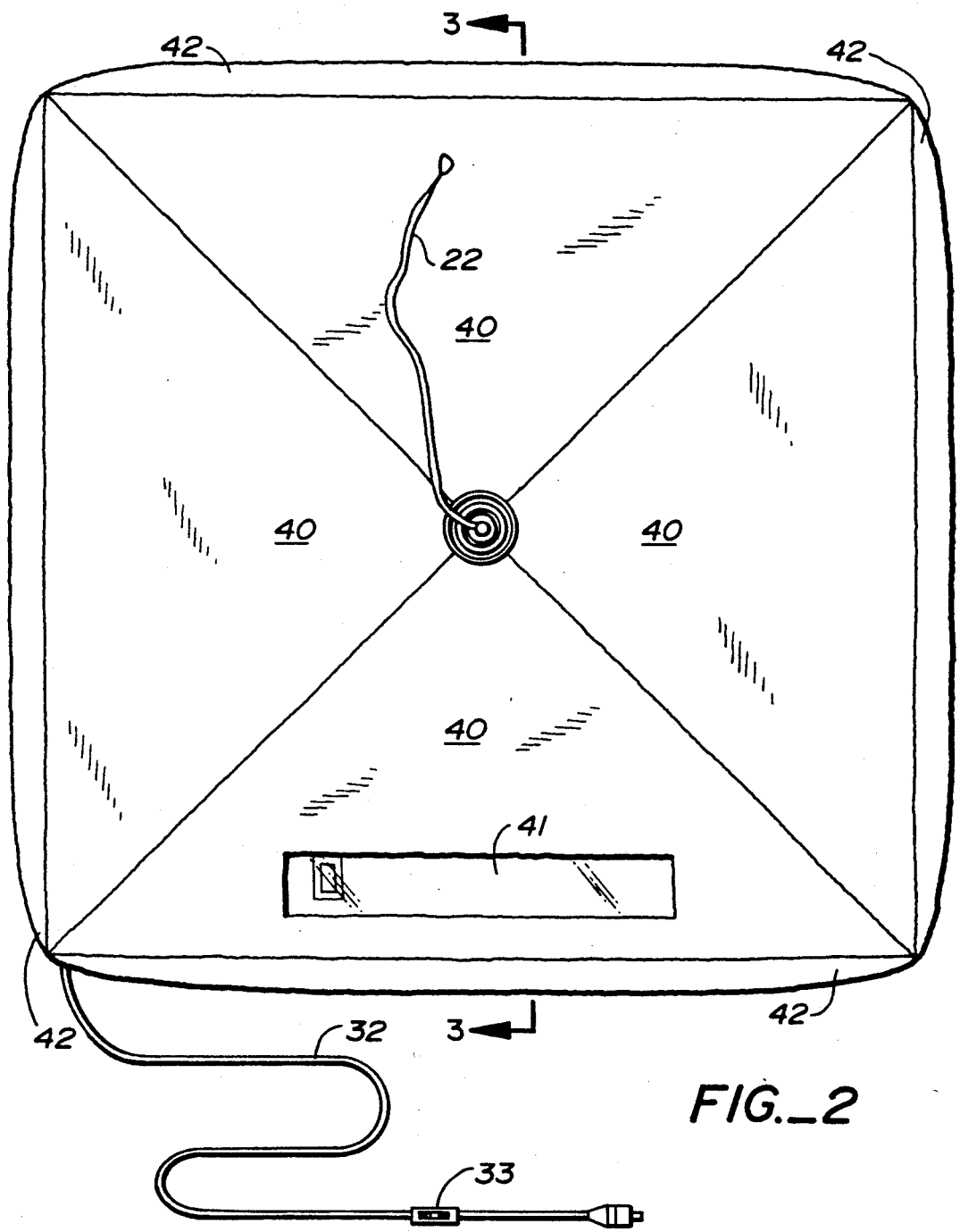
FIG._2

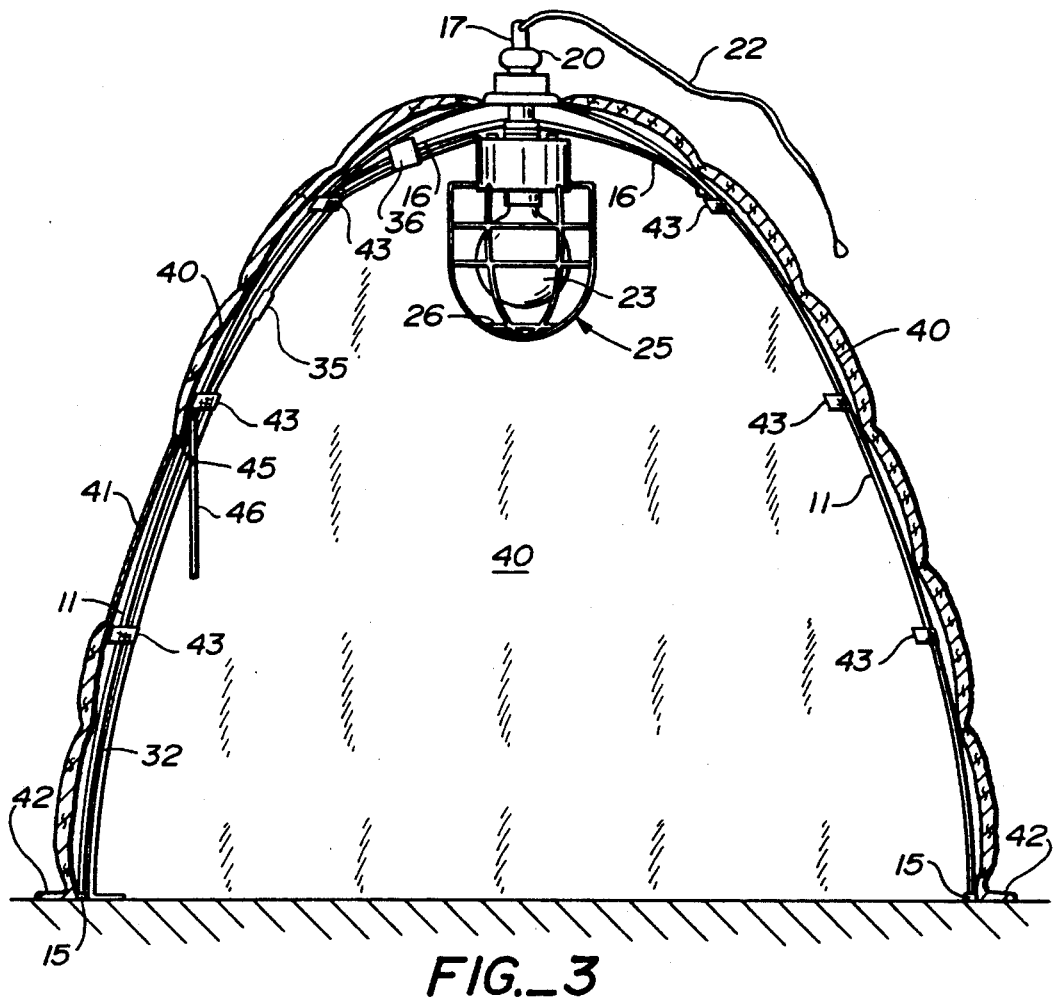
FIG._3

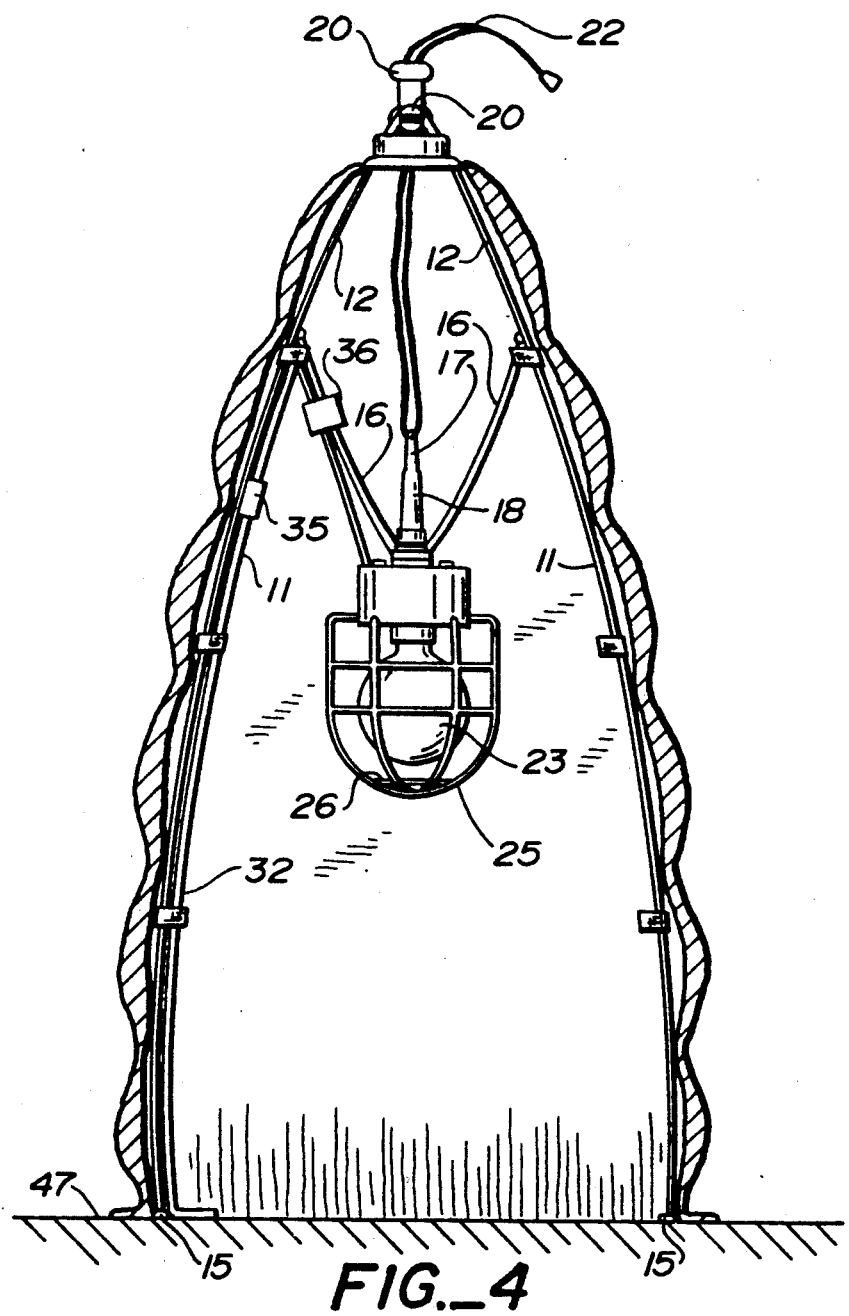
FIG._4

5,216,948

ENVIRONMENT CONTROL CHAMBER WITH SAFETY SWITCH

TECHNICAL FIELD

This invention is in the field of preparing dough for baking.

BACKGROUND ART

Yeast dough that rises before being baked must stand for a period of time while yeast acts to decompose sugar. The decomposition of sugar generates carbon dioxide which produces the bubbles or open spaces within the dough which ultimately give the baked product its texture. Frequently the dough must be knocked down after it rises and permitted to rise again, perhaps several times before the dough is finally ready to bake.

The rising process is very sensitive to ambient conditions. It should take place at a temperature in the range of 75-90 degrees F. and in an environment that is fairly humid. The environment in which the dough riser should also have uniform conditions throughout.

Particularly dough should rise away from drafts which may cool the environment generally or cause one portion of the body of dough to be cooler than other portions. Bread having good and uniform texture requires careful attention to the environment in which the dough rises.

The dough for bread baked at home typically is placed in a baking pan or a bowl which is covered with a cloth which in turn is placed in a warm environment such as in a bowl of hot water, near a heating vent or in an oven. The ambient conditions in the kitchen of an ordinary home will vary from season to season, from day to day and even from day to night so that skill is required to produce uniform conditions in which the dough rises.

Environmental chambers to create the correct conditions for dough to rise are known. Mostly, these environmental chambers are in the form of boxes and many are equipped with controls for temperature and humidity. However, in an ordinary, home kitchen it is important to conserve storage space and it is very desirable for a baking implement such as an environmental chamber to consume a small amount of space when it is stored. Collapsible chambers which occupy a small volume when stored but expand to enclose a large volume when in use are known. Some of these prior collapsible chambers employ an umbrella-like structure and others are supported by legs or ribs that fold. Weiss U.S. Pat. No. 4,210,073 discloses one such environmental chamber which comprises ribs or legs that support panels of flexible, foldable material that can be stretched over the ribs or legs to form an enclosed chamber but can be folded between them when the chamber is collapsed. A problem with a collapsible chamber such as disclosed in the Weiss patent is that when it is standing on a support surface, such as a tabletop or a work counter, the tightly stretched fabric or other foldable material between adjacent legs creates a space between the support surface and the lowest extremity of the foldable, flexible material forming the panel. FIG. 2 of the Weiss patent exemplifies the problem of permitting drafts to enter the environment control chamber in this way. Thus, it is desirable for home use to have a collapsible environmental chamber that can maintain an elevated temperature environment within it and which fits tightly enough against a support surface to exclude drafts from its interior.

DESCRIPTION OF THE INVENTION

This invention is a portable, collapsible environmental chamber particularly useful for creating an isolated environment in which dough may rise. The environmental chamber of this invention includes ribs that are extendable and collapsible, for example in the manner of an umbrella. A flexible, foldable panel of substantially air impervious material is connected between each pair of adjacent ribs. The panels may be plastic or fabric and preferably they are made of quilted fabric having air space between the layers. Quilted fabric not only has some insulating value but is more impervious to being penetrated by air movements or drafts. The panels of flexible foldable material occupy the area between adjacent ribs.

It is also a preferred embodiment of the invention for the flexible, foldable panels to be held onto the ribs with a releasable fastening means such as the hook and loop fastening material marketed under the trademark VELCRO so that they may be removed from the ribs for washing or replacement. The panels may be connected to each other to be in the form of a single piece of material.

The panels used in the environmental chamber of this invention include skirt-like portions that extend beyond the lower extremities of the ribs and depend from the device as loose, flexible extensions. The skirt-like portions depend below a line between the supporting ends of adjacent ribs a distance sufficient so that when the device is in use the skirts lie loosely on the supporting surface. The skirts should extend at least one-half inch and preferably about one inch beneath the line between adjacent rib ends. When the environmental chamber of this invention is in expanded condition and supported on a work surface the skirt-like portions depend from the bottom of the stretched panels and lie loosely on the work surface and in doing so substantially seal the interior of the environmental chamber from drafts that would otherwise blow beneath the tightly stretched panels.

In another embodiment of the invention the device includes a transparent window in at least one panel so that the interior of the chamber can be viewed.

In another embodiment of the invention a heating means is employed within the chamber. In its simplest form the heating means is a low-wattage light bulb that is enclosed in a cage to protect it from being broken and to prevent fire or heat damage to the panels if the chamber collapses during use. The light bulb or other heating means is also preferably provided with a heat shield that is preferably made with a reflective surface facing the heating means to avoid a hot spot within the environmental chamber in direct alignment with the heating means.

Other preferred embodiments of the invention include a thermometer and a means to hold a thermometer to be visible through the transparent panel, means to vary the thermal output of the heating means, such as an in-line dimmer switch or a thermostat, and means such as a microswitch which permits the heating means to operate only when the environmental chamber is in its expanded position.

BRIEF DESCRIPTION OF THE DRAWINGS

FIG. 1 is a top elevation perspective view of a device embodying the invention.

FIG. 2 is a top plan view of the device of FIG. 1.

FIG. 3 is a cross section taken on the plane of the line 3—3 shown in FIG. 2.

FIG. 4 is a front elevation view of the framework of the device with the panels removed and in collapsed position.

BEST MODE FOR CARRYING OUT THE INVENTION

The embodiment illustrated in the drawings is generally designated 10. This embodiment of the invention has four legs or ribs 11 which diverge and converge between an expanded position and a collapsed condition much in the nature of an umbrella. The ribs extend between a converging end 12 and a diverging end 13 and each diverging end of a rib is provided with a foot 15 so that the supporting surface on which the device may stand will be protected from a sharp rib end. Each rib is provided with a spreading strut 16 that extends between a holder 18 and an intermediate location on the rib. The connection between the rib and the spreading strut a well as between the holder and the spreading strut is pivotal, as is known to the art.

The holder for the spreading strut is part of an assembly that includes a guide 17 and a guide collar 20, the guide being operated with an operating cord 22. In the extended position of the device the struts are in a snap over center position which prevents the spring action of the ribs and spreading struts from urging the guide 17 into the collapsed position shown in FIG. 4.

The assembly also includes a heating means shown as a light bulb 23 which is enclosed in a protecting cage 25 that is preferably made of wire and provided with an opaque bottom plate 26. Plate 26 preferably has a reflective upper surface. In the illustrated embodiment of the invention the light bulb is connected through an electric lead 32 to an ordinary plug-in, and lead 32 includes a variable switch 33 so that the amount of heat generated by light bulb 23 can be regulated. An in-line dimmer switch may be used to vary the heat output of the light bulb manually or a thermostat 35 may be employed.

The opaque plate 26 avoids a hot spot directly beneath light bulb 23 so that all parts of the dough within environmental chamber 10 are subjected to approximately the same conditions of temperature and humidity.

A flexible, foldable panel 40 extends between each pair of adjacent ribs or legs 11. One panel is provided with a window 41 which is preferably flexible, foldable plastic so that it may be collapsible. Each panel has a lower depending skirt 42. The skirt 42 extends below the line between the supporting ends of adjacent ribs. The embodiments illustrated in FIGS. 1, 2 and 3 show that skirt 42 lies loosely upon a supporting surface 47 when the device is in expanded position and supported on surface 47. All panels or any combination of panels may be connected together or each panel may be separate. In the illustrated embodiment of the invention releasable holders 43 are provided to secure the panels to the ribs. The releasable holders preferably are hook and loop fasteners marketed under the trademark VELCRO but may be snap fasteners, buttons, ties or the like. Releasable holders permit the panels to be removed from the framework formed by the ribs so that they may be separately stored or washed. The device of this invention is illustrated having four ribs or legs although any number greater than two can be used. In the illustrated embodiment the panel having the window 41 is provided with an interior fabric loop 45 positioned so that a thermometer 46 suspended from loop 45 will be visible through window 41.

In use, the environmental chamber of this invention in collapsed position as shown if FIG. 4 may be expanded by pulling operating cord 22 so that guide 17 extends through guide collar 20 sufficiently to move the struts to snap over center position. In the expanded condition the chamber may be placed on a supporting surface 47 and skirts 42 may be arranged to lie loosely upon supporting surface 47 as illustrated. It may be desirable to arrange skirts 42 to lie flat and to extend as far from the panels 40 as possible thereby to create an adequate seal beneath the tightly stretched portions of panels 40. When the chamber is on the supporting surface 47 light bulb 23 is illuminated to add heat to the interior of the chamber that is now in the condition shown in FIG. 3. The chamber may be maintained empty until the temperature shown on thermometer 46 stabilizes. If the stable temperature is too low or too high it may be adjusted by operation of variable switch 33 until a stable temperature in range of 75-90 degrees F. is obtained. Alternatively, a thermostat may control the temperature as is known to the art. At that point the chamber may be lifted from its supporting surface and bread dough inserted beneath it after which it is again placed on the supporting surface and the skirts 42 are again arranged to lie flat and loosely on the supporting surface. The interior of the chamber will then quickly reach the stable temperature that it achieved prior to the insertion of the bread dough.

The procedure for rising and knocking down the dough is carried out in accordance with known baking techniques after which the bread dough is removed from the environmental chamber and baked. When the environmental chamber is no longer needed it may be collapsed into the configuration shown in FIG. 4 either with the panels still connected to the ribs and folded between them or with first removing them from the ribs. In either case the collapsed device occupies a small volume and may be stored by hanging it on a wall or in a cupboard or placing it in a drawer.

In a preferred embodiment of the invention the panels 40 are made of tightly woven, quilted fabric to provide some insulation and adequate resistance to being penetrated by drafts. Any material may be used for panels 40 as long as it is flexible and foldable. A great deal of insulation is not required because the interior of the chamber is free from drafts and because light bulb 23 may be adjusted to replace heat as fast as it is lost by conduction through the panels 40.

The device illustrated in FIGS. 3 and 4 is provided with a microswitch 36 as a safety feature. Microswitch 36 is positioned on strut 16 in a position where it will contact rib 11 when the chamber is in expanded position as in FIG. 3. The contact with rib 11 causes microswitch 36 to close whereby light bulb 23 may be supplied with power. Should the chamber accidentally collapse, strut 16 will assume the position shown in FIG. 4 and switch 36 will be moved from contact with rib 11 whereby switch 36 will open.

We claim:

1. An environmental chamber comprising:

three collapsible ribs moveable between a stable expanded position and a stable collapsed position, each of said ribs extending from a common restrained convergence region to an unrestrained supporting end with all of said supporting ends lying in substantially the same plane, flexible, foldable, substantially air-impermeable panels supported by said ribs and covering the area between said ribs whereby an enclosed chamber is formed by said flexible panels when said ribs are in extended position and on a supporting surface, each of said panels between two adjacent ribs having a skirt extending beyond the straight line between the supporting ends of said two adjacent ribs, whereby said skirt lies loosely on a surface on which said supporting ends of said ribs are supported, an electrically-operated heat source within said chamber, a switch to actuate said heat source, said switch associated with a collapsible rib to hold said switch in open position when said rib is in collapsed position.

* * * * *